(12) United States Patent
Doll et al.

(10) Patent No.: US 7,059,899 B2
(45) Date of Patent: Jun. 13, 2006

(54) SYSTEMS AND METHODS FOR PARTITIONING BANKS OF PROCESSORS IN LARGE COMPUTER SYSTEMS

(75) Inventors: Wade J. Doll, Seattle, WA (US); Douglas P. Kelley, Seattle, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 11/313,310

(22) Filed: Dec. 21, 2005

(65) Prior Publication Data

US 2006/0099852 A1 May 11, 2006

Related U.S. Application Data

(62) Division of application No. 10/713,170, filed on Nov. 15, 2003, now Pat. No. 6,997,741.

(51) Int. Cl.
*H01R 13/60* (2006.01)
(52) U.S. Cl. .............................. 439/540.1; 439/924.2; 439/357; 439/378
(58) Field of Classification Search ............. 439/540.1, 439/924.2, 357, 378
See application file for complete search history.

(56) References Cited

U.S. PATENT DOCUMENTS

| 5,779,504 A | * | 7/1998 | Dominiak et al. ......... 439/709 |
| 6,345,996 B1 | | 2/2002 | Saito et al. |
| 6,592,387 B1 | | 7/2003 | Komenda et al. |

* cited by examiner

*Primary Examiner*—Truc Nguyen
(74) *Attorney, Agent, or Firm*—Perkins Coie LLP

(57) ABSTRACT

Systems and methods for operatively connecting processor banks in large computer systems are disclosed herein. In one embodiment, a computer system includes a first bank of processors, a second bank of processors spaced apart from the first bank of processors, and a connector assembly configured to operatively connect at least a portion of the first bank of processors to at least a portion of the second bank of processors. The connector assembly can include a first connector unit having a plurality of first connector sets and a second connector unit having a plurality of corresponding second connector sets. At least one of the first and second connector units is movable relative to the other one of the first and second connector units to at least approximately concurrently engage the plurality of first connector sets with the plurality of corresponding second connector sets.

29 Claims, 11 Drawing Sheets

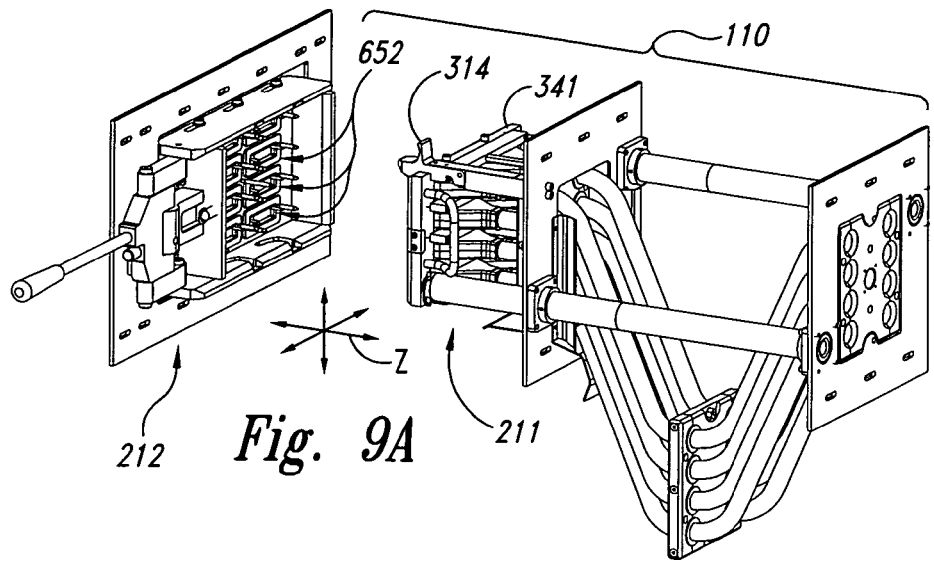
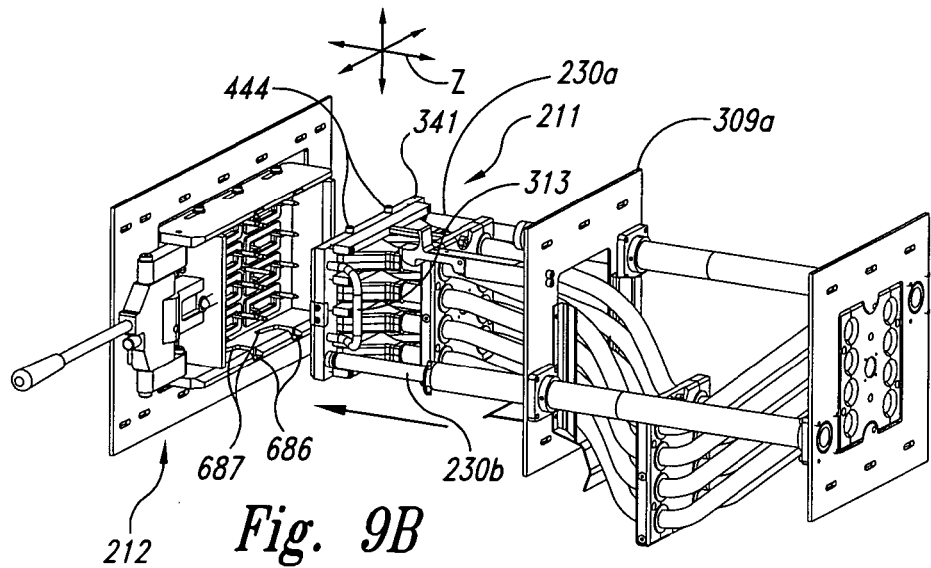
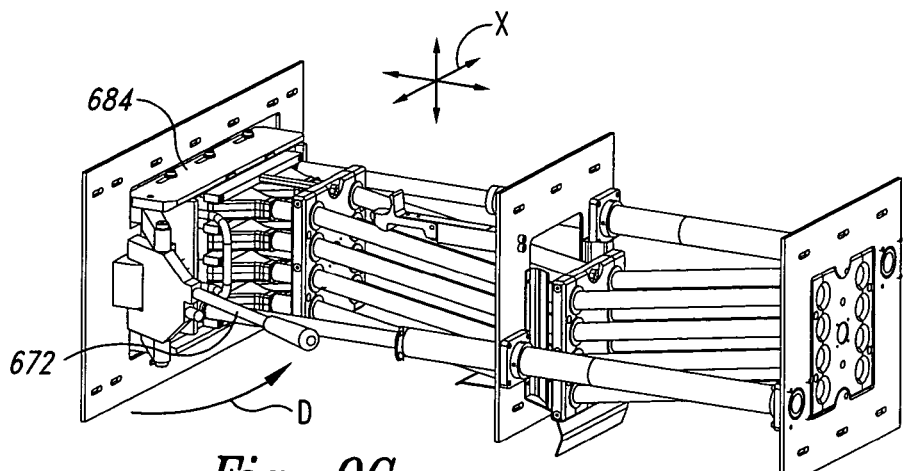

SYSTEMS AND METHODS FOR PARTITIONING BANKS OF PROCESSORS IN LARGE COMPUTER SYSTEMS

CROSS-REFERENCE TO RELATED APPLICATION

This application is a divisional of U.S. patent application Ser. No. 10/713,170, filed Nov. 15, 2003 now U.S. Pat. No. 6,997,741, which is incorporated herein in its entirety by reference.

TECHNICAL FIELD

The following disclosure relates generally to systems and methods for partitioning banks of processors in large computer systems and, more particularly, to connector assemblies for use in large computer systems.

BACKGROUND

Supercomputers and other large computer systems typically include a large number of processors that are operatively connected together by a high performance 3D interconnect system to provide very high computational performance for a wide variety of scientific, engineering and financial applications. The processors are often housed in cabinets arranged in separate banks. The interconnect system accordingly has cables extending between the processor banks to operatively couple the banks together to provide the necessary computational power. If a task requires less computational power, then the processor banks can be "partitioned" to free up the unneeded processors for other tasks.

The ability to partition one bank of processors from another bank of processors enables supercomputers and other large computer systems to be efficiently scaled to meet particular needs. This allows operators of such systems to lease one bank of processors to one user for one task and another bank of processors to another user for another task. For example, a system can be partitioned so that one set of processors can perform classified computations while another set of processors performs unclassified computations. One objective in partitioning processors into distinct sets that simultaneously perform both classified and unclassified computations is to ensure the security of the set of processors performing the classified computations.

Software has been used to partition a first bank of processors from a second bank of processors in a large computer system by creating an electronic partition between the two processor banks. One shortcoming of this approach, however, is that it is possible for the electronic partition to be breached.

To avoid the risks associated with electronically partitioning a first bank of processors from a second bank of processors using software, other systems are partitioned by physically connecting/disconnecting the individual cables between processor banks. This can be a time-consuming process, however, because there are typically a large number of individual cables extending between adjacent processor banks, and each cable has a separate connector that must be individually connected/disconnected from the adjacent processor bank. Another concern of conventional systems for physically partitioning processors is that it is relatively easy to damage the small, delicate pins of the connectors at the ends of the cables. Moreover, as the density and performance of the processors increases, the cable connectors have a higher density of pins. The increase in pin density results in connectors that (a) have smaller and more delicate pins, (b) require more accuracy in aligning the pins with corresponding sockets, and (c) require more force to engage/disengage the connectors. The likelihood of damaging a connector pin during engagement accordingly increases as the number of processors increases.

BRIEF DESCRIPTION OF THE DRAWINGS

FIGS. 9A–C are isometric views illustrating a sequence of operating the connector assembly of FIG. 2 in accordance with an embodiment of the invention.

DETAILED DESCRIPTION

Figure 1:
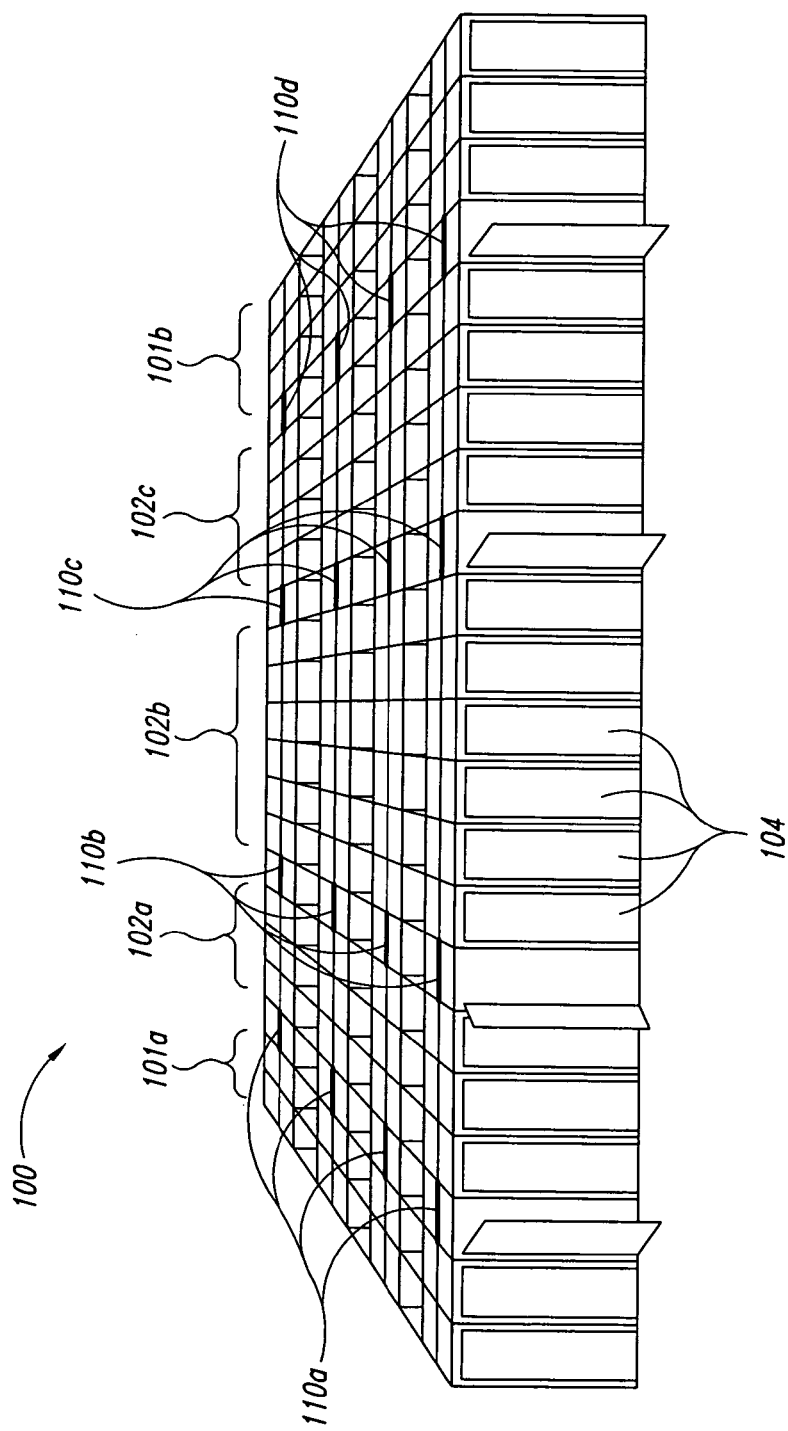
FIG. 1 is an isometric top view of a large computer system configured in accordance with an embodiment of the invention.

The following disclosure describes several embodiments of systems and methods for quickly connecting and disconnecting banks of processors, I/O cabinets, and other computer components to selectively partition large computer systems. One aspect of the invention is directed toward a computer system that includes a first bank of processors spaced apart from a second bank of processors. The computer system further includes a connector assembly configured to operatively connect at least a portion of the first bank of processors to at least a portion of the second bank of processors. In one embodiment, the connector assembly includes a first connector unit carrying a plurality of first connector sets and a second connector unit carrying a plurality of corresponding second connector sets. Individual first connector sets can include a plurality of first contacts operatively connected to the first bank of processors. Similarly, individual second connector sets can include a plurality of corresponding second contacts operatively connected to the second bank of processors. At least one of the first and second connector units is movable relative to the other one of the first and second connector units to releasably engage the plurality of first contacts with the plurality of corresponding second contacts. Engaging these contacts operatively connects the portion of the first bank of processors to the portion of the second bank of processors.

In one aspect of this embodiment, the first connector unit further includes a first connector support that carries the plurality of first connector sets. The first connector support allows the first connector sets to move independently in at least one direction relative to the connector support to facilitate engagement of the plurality of first contacts with the plurality of corresponding second contacts.

In another aspect of this embodiment, the first connector unit further includes a first alignment feature and the second connector unit further includes a corresponding second alignment feature. The first and second alignment features are configured to cooperate as the first and second connector units move toward each other to facilitate alignment of the plurality of first contacts with the plurality of corresponding second contacts.

In a further aspect of this embodiment, the computer system can additionally include a drive assembly operatively coupled to at least one of the first connector unit and the second connector unit. The drive assembly is configured to drive at least one of the first and second connector units toward the other one of the first and second connector units to releasably engage the plurality of first contacts with the plurality of corresponding second contacts.

Another aspect of the invention is directed to a method for operatively connecting a first bank of processors to a second bank of processors in a large computer system. In one embodiment, the method includes at least approximately concurrently aligning a plurality of first connector sets with a corresponding plurality of second connector sets. Individual first connector sets can include a plurality of first contacts operatively connected to the first bank of processors. Similarly, individual second connector sets can include a plurality of corresponding second contacts operatively connected to the second bank of processors. In one aspect of this embodiment, the method can further include at least approximately concurrently engaging the plurality of first contacts with the plurality of corresponding second contacts to operatively connect the first bank of processors to the second bank of processors in the computer system.

Specific details of several embodiments of the invention are described below in order to provide a thorough understanding of such embodiments. Other details describing well-known structures often associated with large computer systems, however, are not set forth in the following description to avoid unnecessarily obscuring the description of the various embodiments. Further, persons of ordinary skill in the art will understand that the invention may have other embodiments with additional elements or without several of the elements described below with reference to FIGS. 1–11.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

FIG. 1 is an isometric top view of a large computer system 100 configured in accordance with an embodiment of the invention. In one aspect of this embodiment, the computer system 100 includes a plurality of processor banks 102a–102c and Input/Output (I/O) banks 101a–b operatively coupled together by a plurality of connector assemblies 110 (shown schematically in FIG. 1 and identified individually as connector assemblies 110a–110d). Each processor bank 102 can include a plurality of processor cabinets 104, and each processor cabinet 104 can in turn house a plurality of processors (not shown). In one embodiment, the I/O banks 101a and 101b can house fiber-optic and electrical connections, and the middle processor banks 102a–c can be computational processor banks.

The computer system 100 can be partitioned to configure the processors into different configurations according to the specific computational tasks being performed. For example, for very large computational tasks, all of the processor banks 102 can be operatively coupled together with the connector assemblies 110 to provide maximum computational power. Alternatively, for smaller computational tasks, different processor banks can be dedicated to different computational tasks. For example, in one embodiment, the processor bank 102a can be dedicated to a first computational task while the processor banks 102b and 102c can be dedicated to another computational task. In other embodiments, other processor bank groupings/arrangements are possible.

In another aspect of this embodiment described in greater detail below, the connector assemblies 110 can be utilized to partition adjacent processor banks 102. In this way, classified computing is performed by one of the processor banks 102 while unclassified computing is performed by a different processor bank. Partitioning the processor and I/O banks physically, rather than electronically, prevents the partition(s) between banks from being breached to reduce the risk of compromising the security of the processors performing classified computations.

Figure 2:
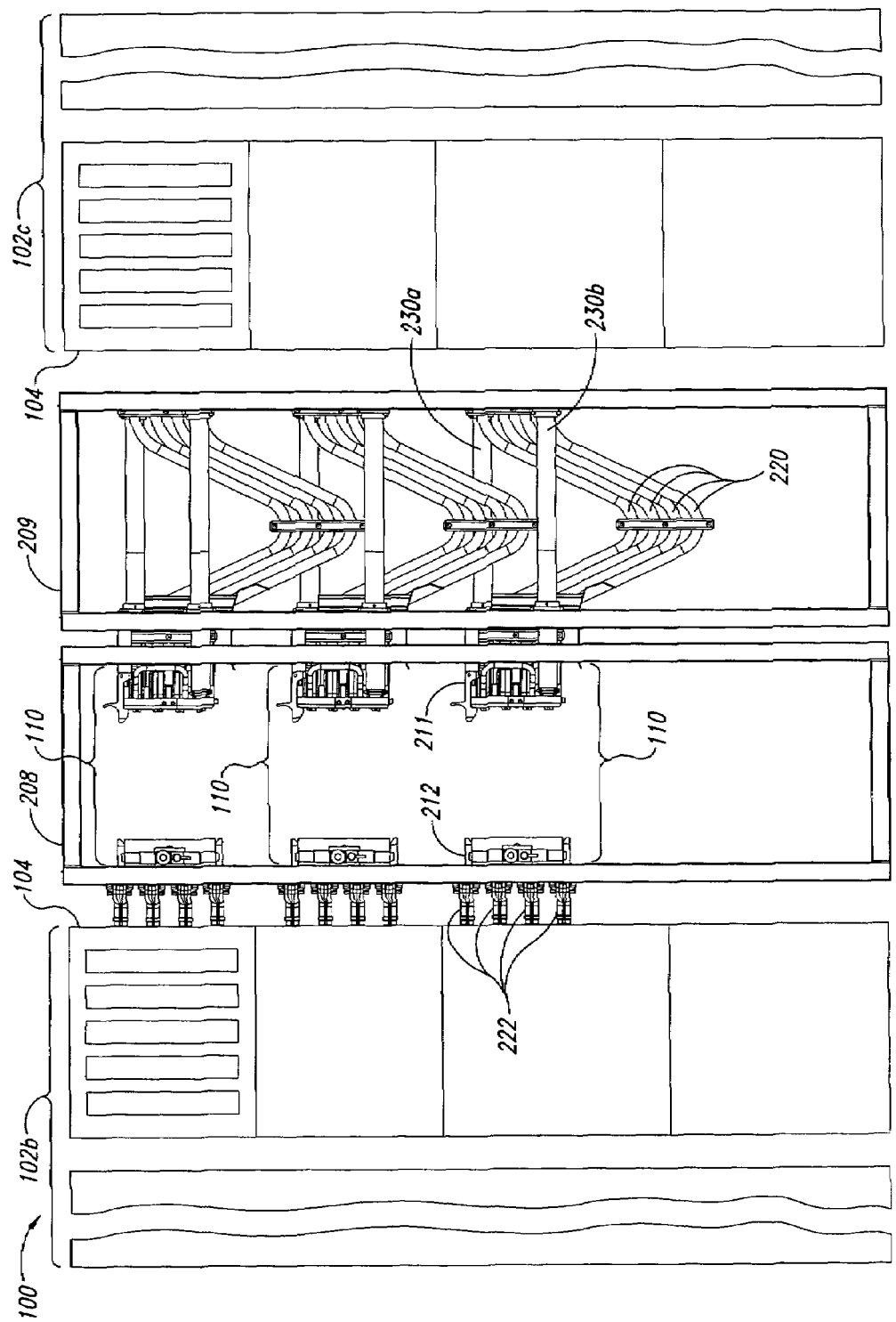
FIG. 2 is an enlarged front elevation view of the computer system of FIG. 1 illustrating an arrangement of connector assemblies positioned between two processor banks in accordance with an embodiment of the invention.

FIG. 2 is an enlarged front elevation view of the computer system 100 of FIG. 1 illustrating an arrangement of the connector assemblies 110 positioned between the second processor bank 102b and the third processor bank 102c in accordance with an embodiment of the invention. In one aspect of this embodiment, each of the connector assemblies 110 includes a first connector unit 211 and a corresponding second connector unit 212. The second connector unit 212 is mounted to one side of a connector cabinet 208 positioned adjacent to the second processor bank 102b. The first connector unit 211 is mounted to distal ends of extendable members 230 (identified individually as a first extendable member 230a and a second extendable member 230b). The extendable members 230 extend through a cable cabinet 209 positioned adjacent to the third processor bank 102c. In one embodiment, the extendable members 230 are telescoping tube assemblies with linear bearings that serve as a guide structure that enables the first connector unit 211 to travel back and forth along a Z axis relative to the second connector unit 212. In other embodiments, the extendable members 230 can have other extension features.

A plurality of first cables 220 extend from the third processor bank 102c to the first connector unit 211 through the cable cabinet 209. When the first connector unit 211 is retracted as shown in FIG. 2, the cable cabinet 209 provides room for the plurality of first cables 220 to recoil. A plurality of second cables 222 similarly extend from the second processor bank 102b to the second connector unit 212. As described in greater detail below, to operatively connect at least a portion of the third processor bank 102c to the second processor bank 102b, the first connector unit 211 is released from the retracted position and moved in the Z direction across the connector cabinet 208 to engage the second connector unit 212.

Figure 3:
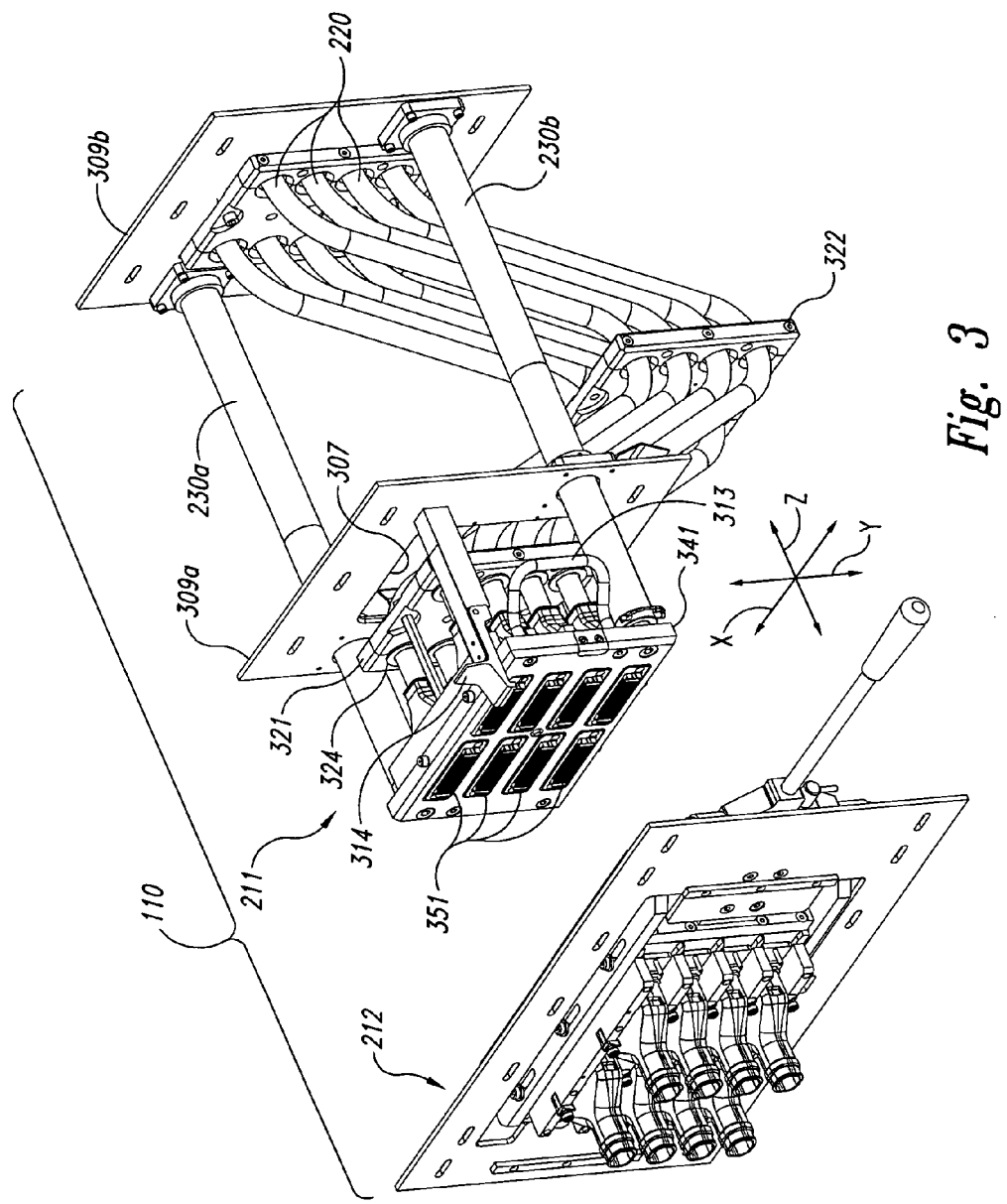
FIG. 3 is an enlarged isometric view of the connector assembly of FIG. 2 configured in accordance with an embodiment of the invention.

FIG. 3 is an enlarged isometric view of the connector assembly 110 in accordance with an embodiment of the invention. In one aspect of this embodiment, the first connector unit 211 includes a first connector support 341 that carries a plurality of first connector sets 351. In the illustrated embodiment, each of the first connector sets 351 is operatively coupled to one of the first cables 220 extending from the third processor bank 102c (FIGS. 1 and 2). The first connector support 341 is attached to distal ends of the extendable members 230. The extendable members 230 are in turn attached to fixed cabinet plates 309a and 309b but are configured to extend and retract along the Z axis to move the first connector unit 211 relative to the second connector unit 212.

The fixed cabinet plate 309a includes an aperture 307 that accommodates the plurality of first cables 220 and allows them to pass freely as the first connector unit 211 moves back and forth along the Z axis. A first cable manager 321 and a second cable manager 322 help to keep the plurality of first cables 220 organized as the first connector unit 211 moves back and forth along the Z axis. The second cable manager 322 has weight that can prevent cable tangling and maintain cable tension to facilitate movement of the first connector unit 211 toward the retracted position. In addition, the first cable manager 321 also includes a plurality of flexible grommets 324 that hold the first cables 220 and reduce strain on the first connector sets 351 from cable forces.

In another aspect of this embodiment, the first connector unit 211 includes a latch 314 configured to releasably hold the first connector unit 211 in the retracted position as illustrated in FIG. 3. As described in greater detail below, an operator can release the latch 314 and move the first connector unit 211 toward the second connector unit 212 along the Z axis by means of a handle 313.

Figure 4:
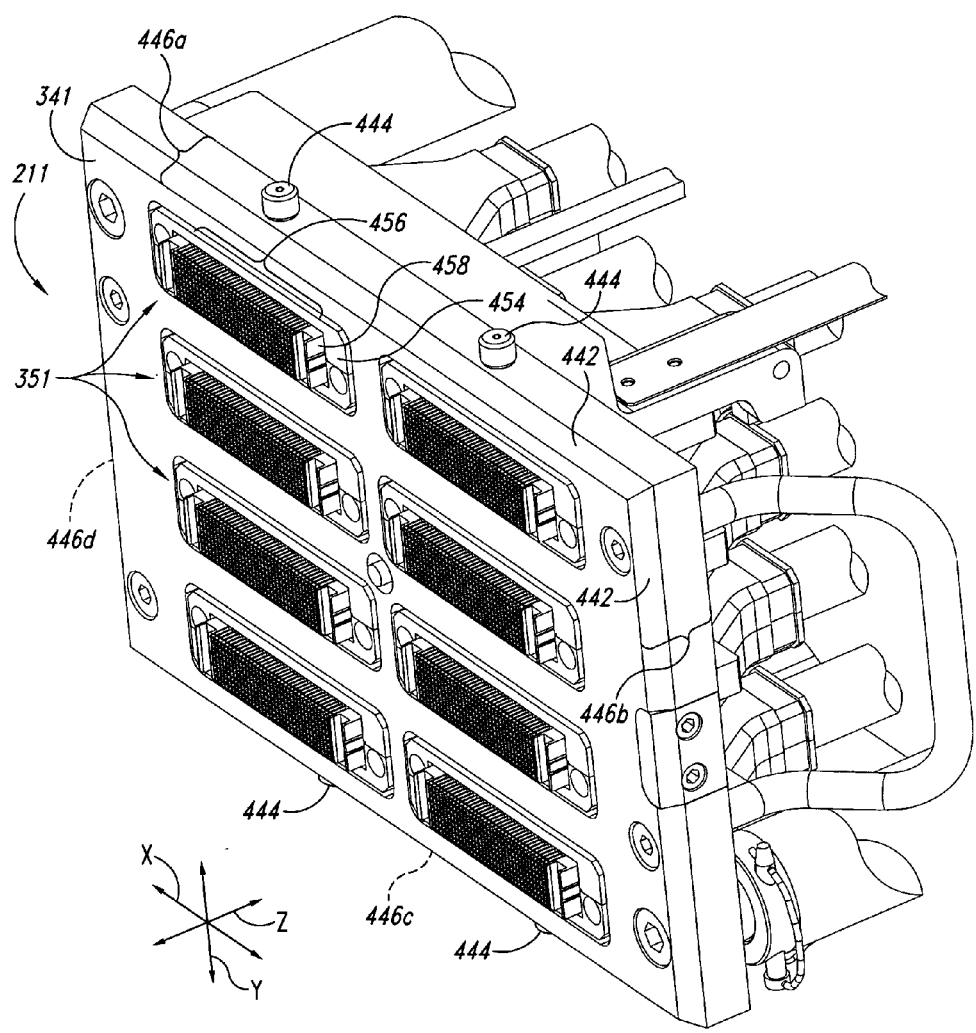
FIG. 4 is an enlarged isometric view of a first connector support configured in accordance with an embodiment of the invention.

FIG. 4 is an enlarged isometric view of the first connector unit 211 in accordance with an embodiment of the invention. In one aspect of this embodiment, each first connector set 351 includes a first connector back-shell 454 carried by the first connector support 341. The first connector back-shells 454 can move a small distance in the X and/or Y directions relative to the first connector support 341, but the back-shells 454 are constrained in the Z direction relative to the first connector support 341. Each first connector back-shell 454 carries a first array frame 458 that in turn carries a first contact array 456. The first array frame 458 can move a small distance in the X and/or Y directions relative to the first connector back-shell 454, but the first array frame 458 is constrained in the Z direction relative to the first connector back-shell 454. As described in greater detail below, the movement of the first connector back-shell 454 and the array frame 458 in the X and/or Y directions facilitates alignment of the first contact array 456 with a corresponding second contact array on the second connector unit 212 (FIGS. 2 and 3) during engagement of the two connector units.

In the illustrated embodiment, the first connector support 341 has a rectangular shape defined by four side portions 446 (identified individually as side portions 446a–d). Each of the side portions 446 can include a beveled surface 442 that, as described in greater detail below, facilitates macro-level alignment of the first connector support 341 with the second connector unit 212 during engagement of the two connector units.

In another aspect of this embodiment, the first connector unit 211 also includes a plurality of cam followers 444 extending outwardly from the first side portion 446a and the third side portion 446c of the first connector support 341.

The cam followers 444 can include needle bearings for rotatably mounting the cam followers 444 to the side portions 446 for rotation about the Y axis. As described in greater detail below with respect to one particular embodiment, the cam followers 444 can engage corresponding cam surfaces on the second connector unit 212 to mechanically drive the first connector support 341 in the Z direction to engage the plurality of first connector sets 351 with corresponding second connector sets on the second connector unit 212.

Figure 5:
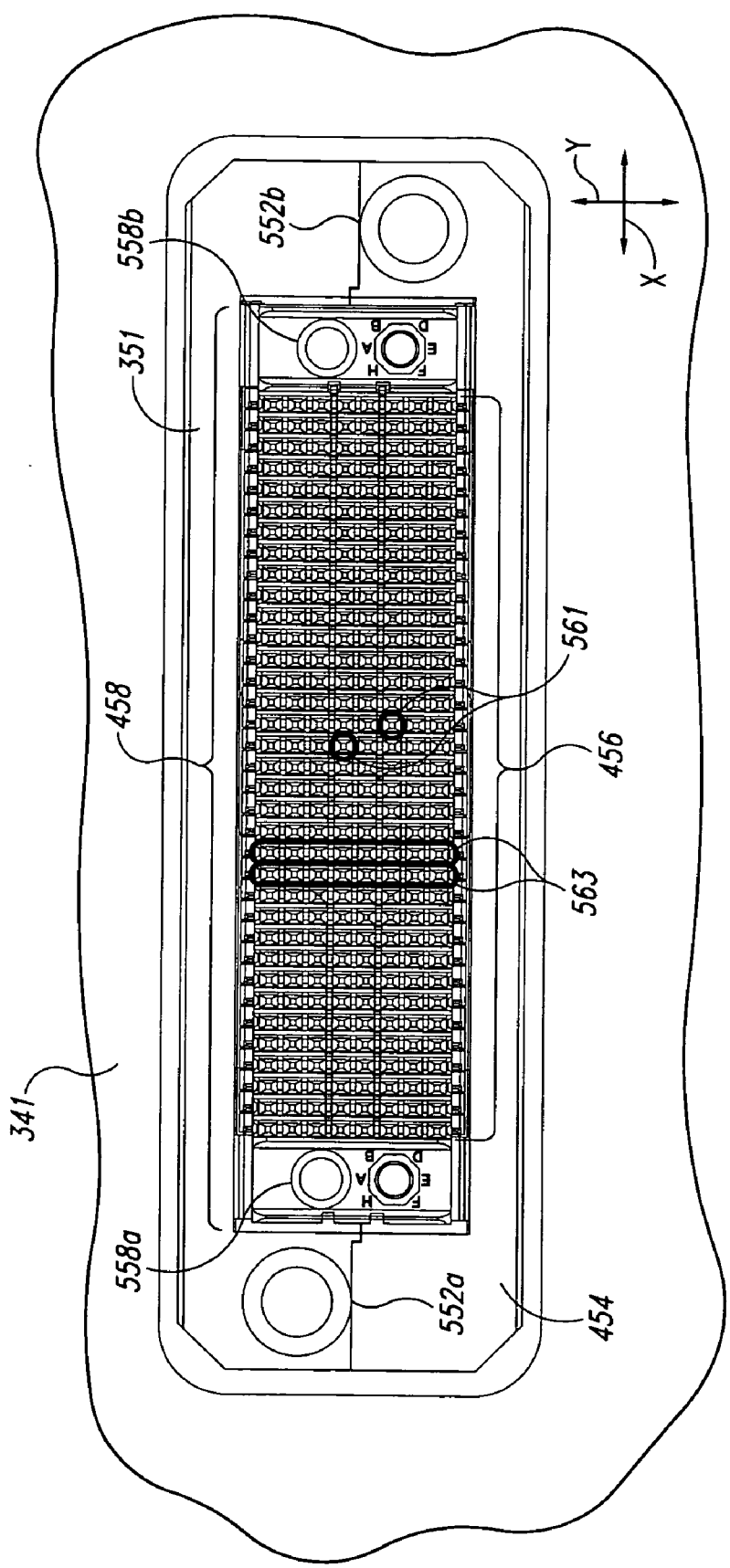
FIG. 5 is an enlarged front view of a first connector set configured in accordance with an embodiment of the invention.

FIG. 5 is an enlarged front view of a portion of the first connector support 341 illustrating aspects of the first connector set 351 in accordance with an embodiment of the invention. The first connector back-shell 454 of this embodiment includes primary pin bores 552 (identified individually as a first primary pin bore 552a and a second primary pin bore 552b). The primary pin bores 552 are configured to receive corresponding primary guide pins on the second connector unit 212 (not shown) to facilitate alignment of the first contact array 456 with a corresponding second contact array on the second connector unit 212. The ability of the first connector back-shell 454 to move in the X and Y directions relative to the first connector support 341 facilitates alignment of the primary pin bores 552 with the corresponding primary guide pins. The primary pin bores 552 are one type of first primary alignment element for aligning the first connector set 351 with a corresponding second connector set.

In another aspect of this embodiment, the first array frame 458 includes secondary pin bores 558 (identified individually as a first secondary pin bore 558a and a second secondary pin bore 558b). The secondary pin bores 558 are configured to receive corresponding secondary guide pins on the second connector unit 212 to further facilitate alignment of the first contact array 456 with the corresponding second contact array on the second connector unit 212. The ability of the first array frame 458 to move in the X and Y directions relative to the first connector back-shell 454 facilitates alignment of the secondary pin bores 558 with the corresponding secondary guide pins. The secondary pin bores 558 are one type of first secondary alignment element for further aligning the first connector set with a corresponding second connector set.

In a further aspect of this embodiment, the first contact array 456 includes a plurality of first contacts 561. In the illustrated embodiment, the first contacts 561 are sockets configured to releasably engage corresponding connector pins (second contacts) of the corresponding second contact array on the second connector unit 212. The individual first contacts 561 are arranged in columns or stacks 563 in the first array frame 458. In yet another aspect of this embodiment, the individual first contacts 561 in any given stack 563 are free to move up and down in the Y direction independently of the other first contacts 561 in the particular stack 563. This limited movement in the Y direction can further facilitate proper alignment between the first contacts 561 and corresponding second contacts on the second connector unit 212.

Figure 6:
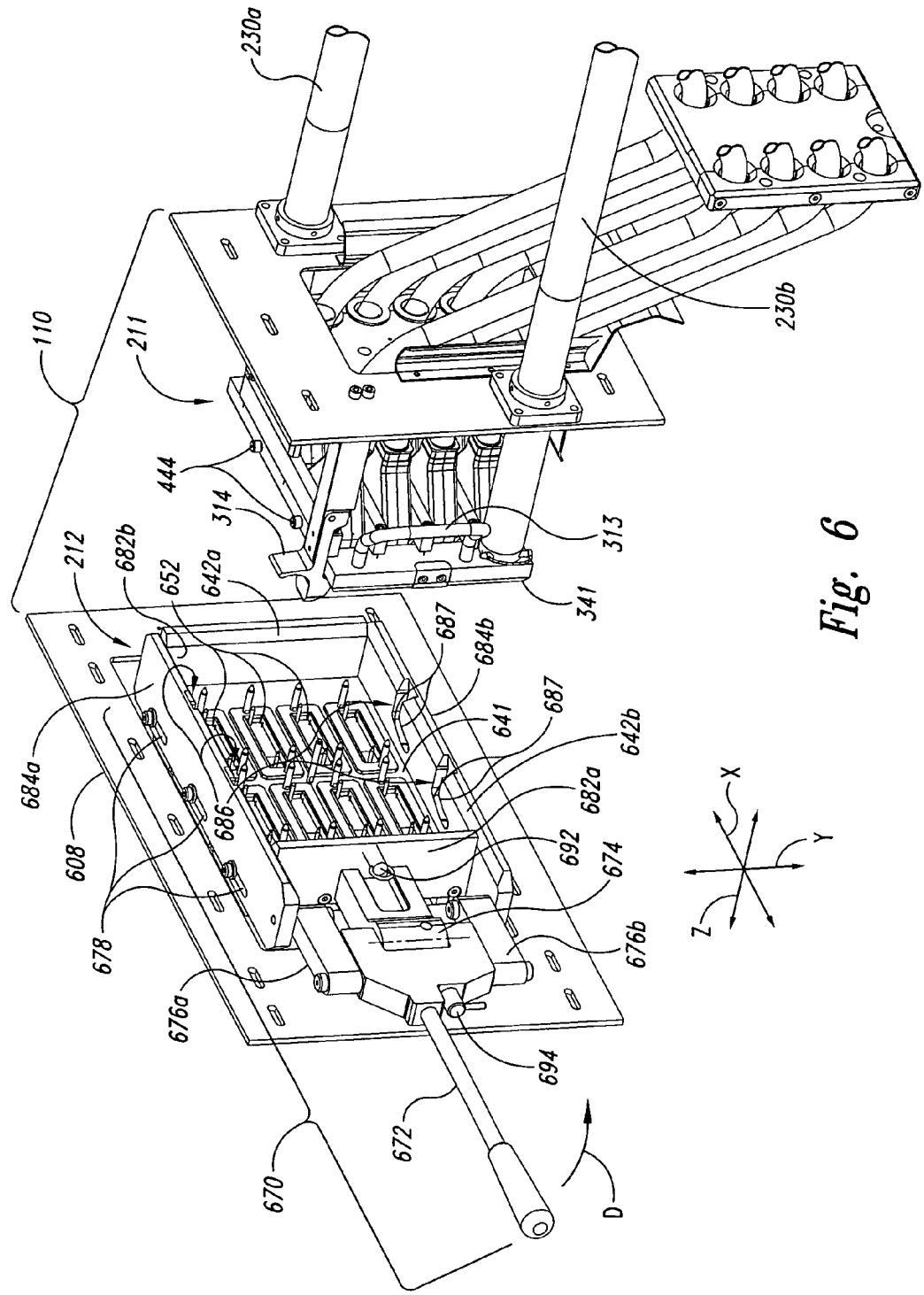
FIG. 6 is another enlarged isometric view of the connector assembly of FIG. 2 configured in accordance with an embodiment of the invention.

FIG. 6 is an enlarged isometric view of the connector assembly 110 of FIG. 2 illustrating features of the second connector unit 212 in accordance with an embodiment of the invention. In this embodiment, the second connector unit 212 is attached to a fixed cabinet plate 608 of the connector cabinet 208 (FIG. 2). The second connector unit 212 of this embodiment includes a second connector support 641 that carries a plurality of second connector sets 652 configured to releasably engage the corresponding first connector sets 351 of the first connector unit 211 (FIGS. 3–5). The second connector support 641 can include fixed side portions 682a–b extending outwardly toward the first connector unit 211. The fixed side portions 682 can include beveled surfaces 642a configured to cooperate with the corresponding beveled surfaces 442 (FIG. 4) on the first connector support 341 to align the first connector support 341 with the second connector support 641 during initial engagement of the first connector unit 211 with the second connector unit 212.

In another aspect of this embodiment, the second connector unit 212 includes a drive assembly 670 having a lever 672 pivotally attached to a base portion 674. The lever 672 can be coupled to movable side portions 684a–b via linkages 676a–b. The movable side portions 684 can include beveled surfaces 642b to further facilitate initial alignment of the first connector support 341 with the second connector support 641 during engagement of the first connector unit 211 with the second connector unit 212. The movable side portions 684 are slidably attached to the second connector support 641 by means of slotted holes 678. Rotation of the lever 672 about the base portion 674 in a direction D causes the movable side portions 684a–b to advance from left to right in the X direction relative to the second connector support 641.

In a further aspect of this embodiment, each of the movable side portions 684 includes two guide channels 686. Each of the guide channels 686 is configured to receive a corresponding one of the cam followers 444 extending outwardly from the first connector support 341. In addition, each of the guide channels 686 includes cam surfaces 687 configured to contact the corresponding cam follower 444 when the movable side portions 684 move in the X direction. For example, when the movable side portions 684 advance from left to right in the X direction, the cam surfaces 687 draw the first connector support 341 into the second connector unit 212 to engage the plurality of first connector sets 351 with the plurality of corresponding second connector sets 652 at least approximately concurrently. Conversely, when the movable side portions 684 retract from right to left in the X direction, the cam surfaces 687 push the first connector support 341 away from the second connector unit 212 to disengage the plurality of first connector sets 351 from the plurality of corresponding second connector sets 652 at least approximately concurrently. The guide channels 686 help to maintain alignment of the first connector support 341 during engagement/disengagement of the first and second connector sets 351 and 652.

To engage the plurality of first connector sets 351 with the plurality of second connector sets 652, an operator (not shown) releases the latch 314 and moves the first connector unit 211 in the Z direction with the handle 313. The extendable members 230 ensure that the first connector support 341 is at least approximately aligned with the second connector support 641 when it arrives at the second connector unit 212. When the first connector support 341 contacts the second connector unit 212, the beveled surfaces 642 on the fixed side portions 682 and the movable side portions 684 further align the first connector support 341 so that the cam followers 444 move into the guide channels 686. From this point, the operator continues moving the first connector unit 211 in the Z direction until the cam followers 444 are adjacent to the cam surfaces 687 just past the jog in the guide channels 686. Next, the operator rotates the lever 672 in the direction D causing the movable side portion 684 to advance from left to right in the X direction to further drive first connector sets 351 into corresponding second connector sets 652 at generally the same moment as explained above. When the lever 672 is at least approximately aligned with the Z axis, the first connector sets 351 are fully engaged with the second connector sets 652 and the cam followers 444 are locked in position toward distal ends of the guide channels 686.

The second connector unit 212 can include additional safety features to prevent inadvertent engagement with the first connector unit 211. In one aspect of this embodiment, a blocking pin 692 must be retracted to clear the way forward for the first connector support 341 before moving the first connector support 341 into the second connector unit 212. This safety feature prevents the first connector unit 211 from inadvertently being rammed into the second connector unit 212 and causing damage to the connector sets. In another aspect of this embodiment, a lever lock 694 must be disengaged to unlock the lever 672 before rotating the lever 672. The lever lock 694 can be re-engaged when the lever 672 is at least approximately aligned with the Z axis to lock the first connector unit 211 in engagement with the second connector unit 212.

Figure 7:
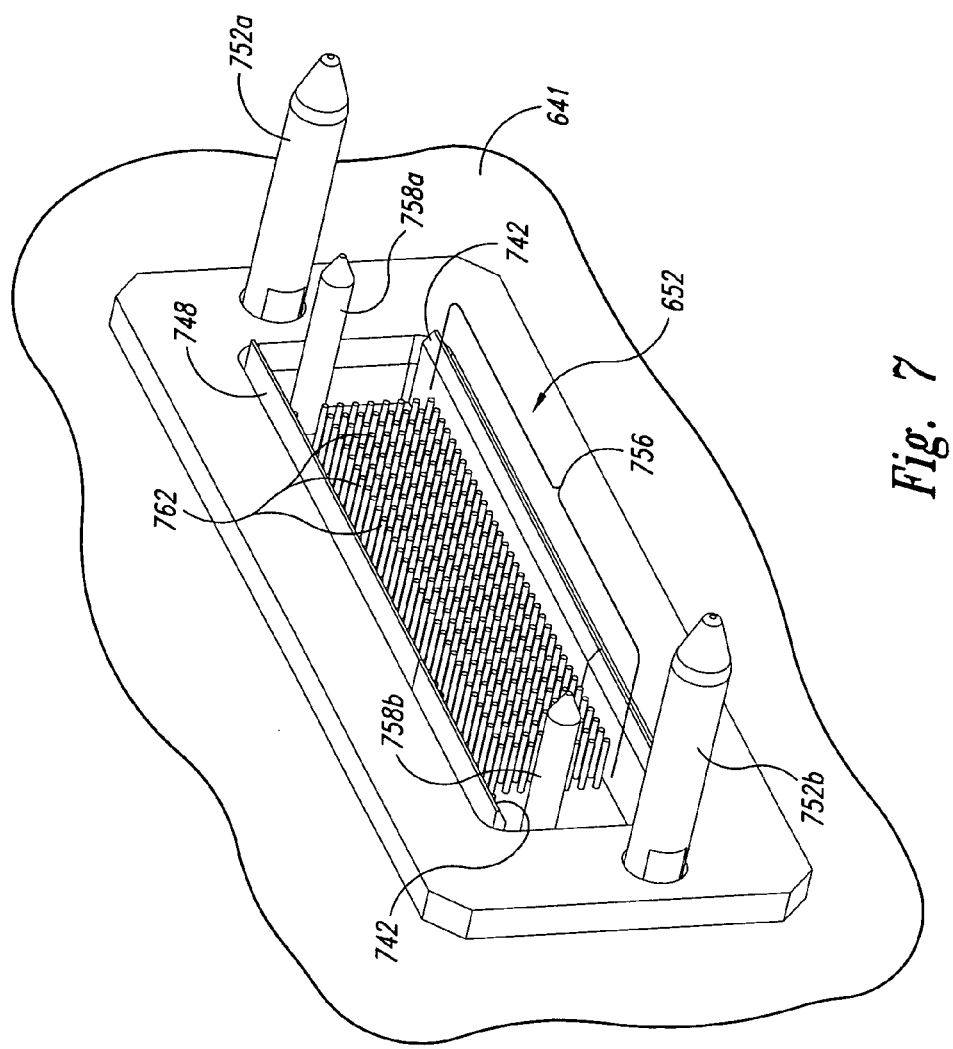
FIG. 7 is an enlarged isometric view of a portion of a second connector support illustrating features of a second connector set in accordance with an embodiment of the invention.

FIG. 7 is an enlarged isometric view of a portion of the second connector support 641 illustrating features of one particular type of second connector set 652 in greater detail. In the embodiment shown in FIG. 7, each second connector sets 652 includes a plurality of second contacts 762 arranged in a second contact array 756. The second contacts 762 in this embodiment are connector pins configured to releasably engage corresponding sockets (i.e., the first contacts 561 of FIG. 5). The second contact array 756 is carried by a second array frame 748, and the second array frame 748 is attached to the second connector support 641. The second array frame 748 includes two beveled surfaces 742 configured to align the corresponding first array frame 458 (FIG. 5) before the first contact array 456 engages the second contact array 756.

In another aspect of this embodiment, the second connector set 652 can include two primary guide pins 752a–b and two secondary guide pins 758a–b. The primary guide pins 752 can define second primary alignment elements, and the secondary guide pins 758 can define second secondary alignment elements. The two primary guide pins 752 extend outwardly from the second connector support 641 and are configured to be received in the primary pin bores 552 on the corresponding first connector back-shell 454 (FIG. 5). The secondary guide pins 758 extend outwardly from the second array frame 748 and are configured to be received in the secondary pin bores 558 on the corresponding first array frame 458 (FIG. 5).

Figure 8:
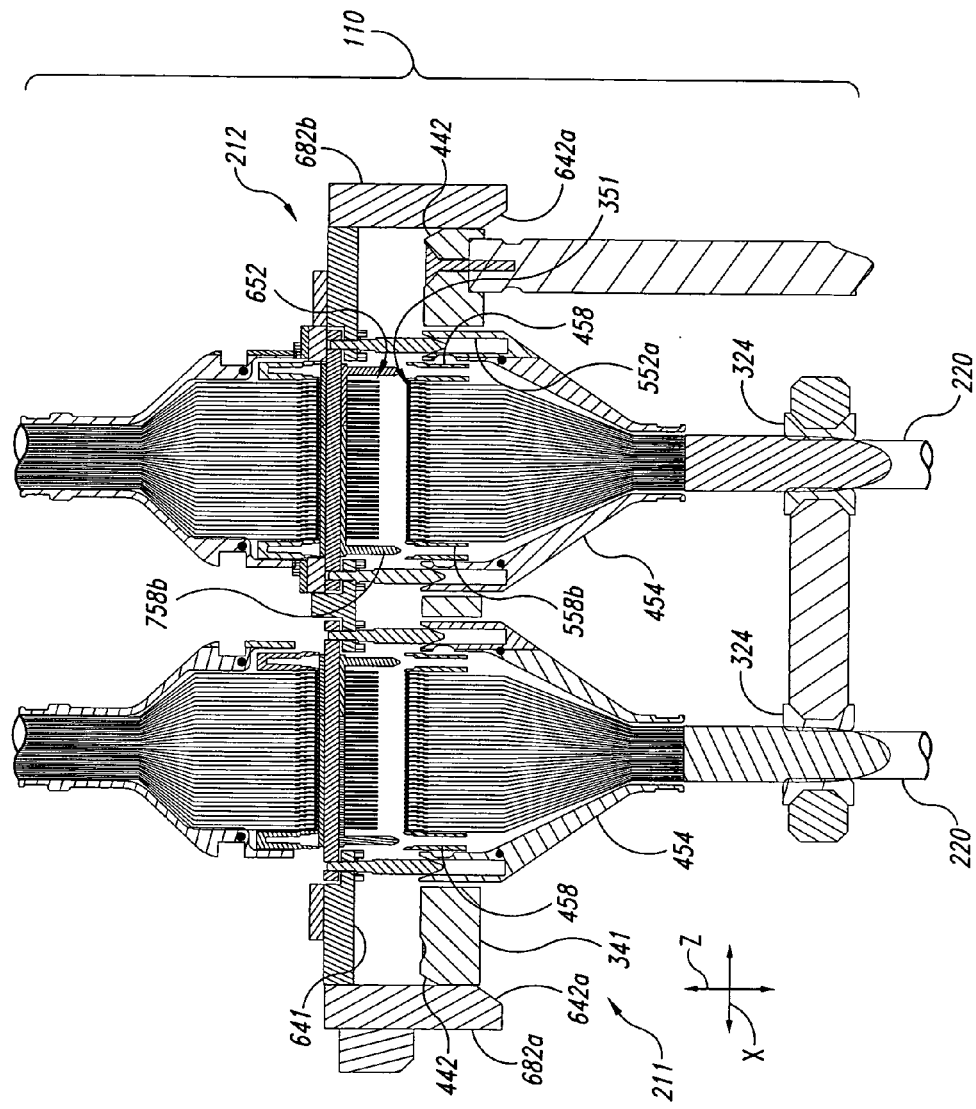
FIG. 8 is an enlarged cross-sectional top view of the connector assembly of FIG. 2 at a stage of partial engagement illustrating some alignment features of embodiments of the invention.

FIG. 8 is an enlarged cross-sectional top view of the connector assembly 110 illustrating some of the alignment features discussed above with reference to FIGS. 4–7. The first connector sets 351 illustrated in FIG. 8 are at an initial stage of engagement with the corresponding second connector sets 652. At this stage, the first beveled surfaces 442 of the first connector support 341 and the second beveled surfaces 642a of the second connector support 641 have guided the first connector support 341 into the second connector support 641 to provide initial alignment of the first connector sets 351 with respect to corresponding second connector sets 652. In addition, the primary guide pins 752 are partially received in corresponding primary pin bores 552 of the first connector back-shells 454. The primary guide pins 752 further refine the alignment between the first connector sets 351 and corresponding second connector sets 652. More specifically, the back-shells 454 move in the X-Y plane as the tapered ends of the guide pins 752 move along the tapered opening of the bores 552. Further movement of the first connector unit 211 toward the second connection unit 212 in the Z direction causes the secondary guide pins 758 to be received in the secondary pin bores 558 on corresponding first array frames 458. The secondary guide pins 758 provide even further refinement of the alignment between the first connector sets 351 and corresponding second connector sets 652 because the first array frames 458 move in the X-Y plane when the tapered ends of the secondary guide pins pass through the tapered openings of the secondary bores 558.

At this point, however, the first contacts 561 are still not engaged with the second contacts 762. Further movement of the first connector unit 211 in the Z direction causes the beveled surfaces 742 on the second array frame 748 (FIG. 7) to further align the first array frame 458 (FIG. 5) before the first contacts 561 begin engaging the second contacts 762. Continued movement in the Z direction causes the first contacts 561 to engage the corresponding second contacts 762. During this engagement, the ability of the individual first contacts 561 (FIG. 5) to move independently in the Y direction relative to each other provides yet another level of alignment to reduce the likelihood of damaging connector pins.

In one embodiment as described above with reference to FIG. 6, the final movement of the first connector unit 211 toward the second connector unit 212 for engagement of the first contacts 561 with the second contacts 762 is provided by the drive assembly 670. In this embodiment, movement of the side portions 684 (FIG. 6) from left to right in the X direction causes the cam surfaces 687 to uniformly draw the four cam followers 444 deeper into the corresponding guide channels 686. The uniform movement of the first connector support 341 toward the second connector unit 212 helps to maintain alignment of the plurality of first contacts 561 with the plurality of corresponding second contacts 762 as they are at least approximately concurrently engaged.

The staged alignment features described above and illustrated in FIG. 8 greatly reduce the likelihood of damaging an individual contact during mating of the first connector sets 351 with the second connector sets 652. These alignment features move the respective connector sets in the X-Y plane as required to accurately align the individual first contacts 561 with corresponding second contacts 762. In addition, the flexible grommets 324 discussed above support the first cables 220 in a manner that complements these alignment features by providing additional strain relief from cable loads to allow the back-shells 454 to move more freely in the X-Y plane.

The aspect of mounting a plurality of first connector sets 351 on a unitary member such as the first connector support 341 also offers certain advantages. For example, this configuration enables multiple connector sets to be connected together at least approximately concurrently to eliminate independently connecting each connector. The drive assembly 670 described above with reference to FIG. 6, moreover, provides sufficient force to engage and disengage the plurality of first connector sets 351 from the plurality of second connector sets 652 and distributes the force against multiple points around the first connector support 341 to ensure continued alignment.

Although the foregoing discussion describes selected aspects of certain embodiments of the invention, those of ordinary skill in the art will appreciate that many of the structures described above have alternate embodiments consistent with this disclosure. For example, although the drive assembly 670 described above with reference to FIG. 6 is a manually operated device, in other embodiments, connector assemblies configured in accordance with the present invention can include automatic drive assemblies. In one such embodiment, a connector assembly can include a hydraulic or pneumatic drive assembly that utilizes hydraulic/pneumatic pressure to engage the first connector unit 211 with the second connector unit 212. In another embodiment, a mechanical drive screw can be employed to move the first connector unit 211 toward the second connector unit 212 for engagement. The drive screw can be driven, for example, by an electric stepper motor. Furthermore, the guide channels 686 and the cam surfaces 687 described above with reference to FIG. 6 represent but one mechanical system for exerting a drive force on the first connector unit 211 to move the first connector support 341 toward/away from the second connector support 641 and overcome the contact engagement forces. Accordingly, in other embodiments, other mechanical, electrical, magnetic, pneumatic and/or hydraulic systems can be used.

In addition, although some of the alignment features described above include beveled surfaces and/or alignment pins, in other embodiments, other alignment features can be utilized without departing from the present disclosure. For example, in another embodiment, an optical alignment system could be used instead of a physical alignment system. In further embodiments, other physical alignment systems, such as a roller/track alignment system, can be used to align the plurality of first connector sets 351 with the plurality of second connector sets 652 before engagement. Furthermore, although the plurality of first connector sets 351 described above have a plurality of contacts, in other embodiments, connectors having only one contact can be used. In yet other embodiments, a connector unit configured in accordance with the present invention can include some connector sets having a plurality of contacts and other connector sets having only one contact. Based on the foregoing discussion, those of ordinary skill in the relevant art will appreciate that the present invention is not limited to the particular embodiments described above and illustrated in FIGS. 1–8.

FIGS. 9A–C are isometric views illustrating a sequence of operating the connector assembly 110 in accordance with an embodiment of the invention. In FIG. 9A the connector assembly 110 is in the retracted position as would be appropriate, for example, when partitioning a first bank of processors from a second bank of processors in a very large computer system such as the computer system 100 of FIG. 1. In this position, the latch 314 engages the first connector support 341 to prevent the first connector unit 211 from inadvertently moving in the Z direction toward the second connector unit 212. In addition, this position allows an operator (not shown) to visually inspect the first connector sets 351 and the second connector sets 652 to ensure that the associated contacts are in good condition and suitable for engagement. The latch 314 can then be released to unlock the first connector unit 211 for movement in the Z direction. In one embodiment, inspecting the connector sets 351 and 652 and unlocking the first connector unit 211 can take the operator about 12 seconds or less. In another embodiment, these steps can take the operator about 5 seconds or less.

Referring next to FIG. 9B, the operator grasps the handle 313 on the first connector unit 211 and manually moves the first connector unit 211 toward the second connector unit 212 in the Z direction. The extendable members 230 telescope outwardly toward the second connector unit 212 and hold the first connector unit 211 in approximate alignment with the second connector unit 212. After traversing the distance to the second connector unit 212, the operator retracts the blocking pin 692 (FIG. 6) to clear the way forward and continues to move the first connector unit 211 in the Z direction until the first connector support 341 moves into the second connector unit 212 and the cam followers 444 move into the guide channels 686. This motion continues until the cam followers 444 arrive at the jog in the guide channels 686 adjacent to the cam surfaces 687. In this embodiment, moving the first connector support 341 into this position can take the operator about 3 seconds or less. In another embodiment, these steps can take the operator about 2 seconds or less.

Referring next to FIG. 9C, once the cam followers 444 are adjacent to the cam surfaces 687 on the movable side portions 684, the operator releases the lever lock 694 (FIG. 6) and rotates the lever 672 in direction D causing the movable side portions 684 to advance from left to right in the X direction. This motion drives the first connector support 341 deeper into the second connector unit 212 to engage the plurality of first connector sets 351 with corresponding second connector sets 652 in a single operation. In this embodiment, the operator can perform these steps in about 3 seconds or less.

The foregoing discussion illustrates that the operator can at least approximately concurrently engage multiple pairs of connector sets in a total of about 18 seconds or less in one embodiment of the invention. The ability to accurately align and engage multiple connector sets this quickly with little risk of damaging the connectors can greatly simplify the task of operatively coupling/decoupling one bank of processors to another bank of processors in a large computer system.

Figure 10:
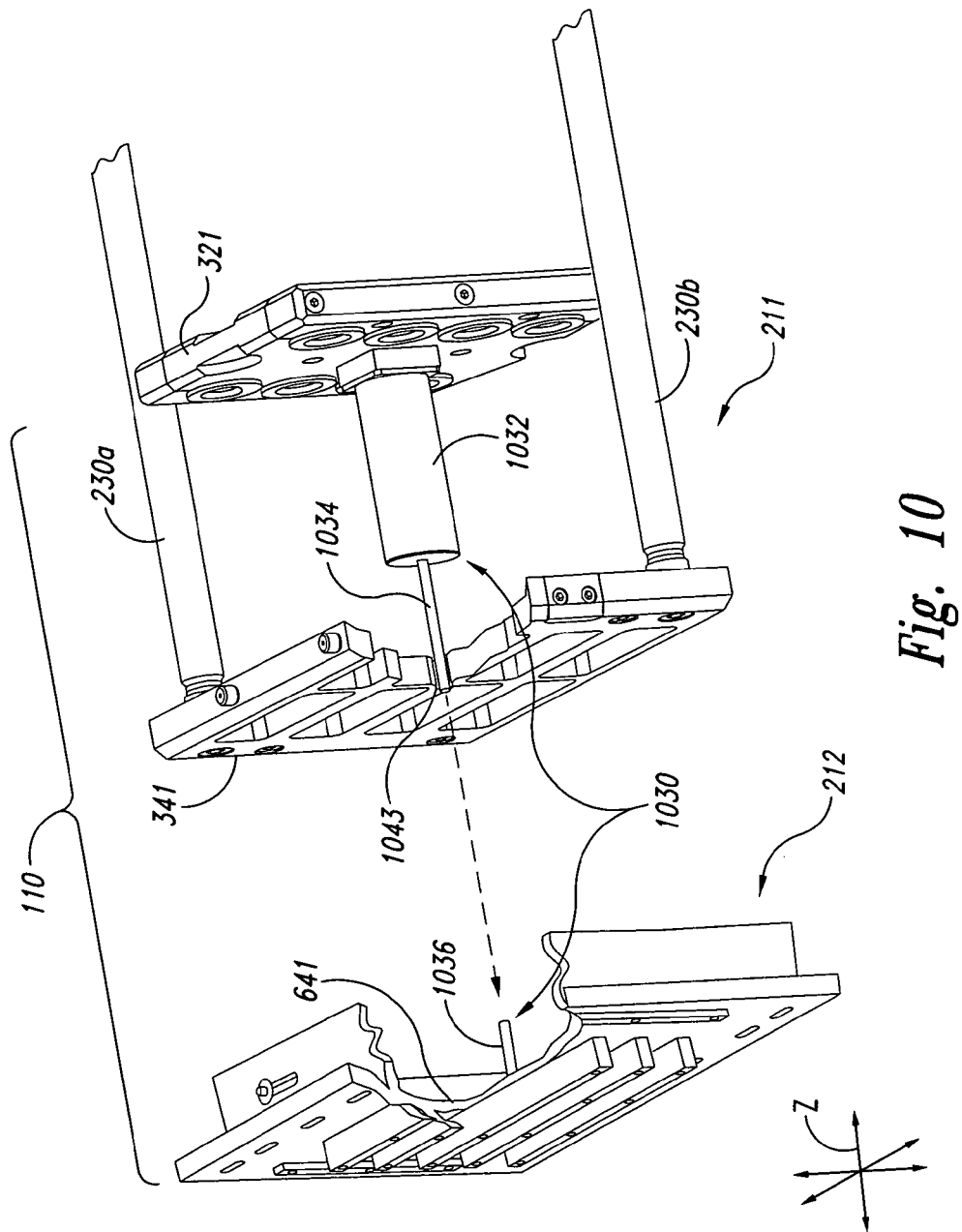
FIG. 10 is a partially cutaway isometric view of the connector assembly of FIG. 2 illustrating features of a shock absorber system configured in accordance with an embodiment of the invention.

FIG. 10 is a partially cutaway isometric view of the connector assembly 110 illustrating features of a shock absorber system 1030 configured in accordance with an embodiment of the invention. Some of the structures described above and illustrated in the preceding Figures have been omitted from FIG. 10 for purposes of clarity. In the illustrated embodiment, the shock absorber system 1030 includes a shock absorber body 1032 fixedly attached to the first cable manager 321. A first snubber 1034 extends outwardly from the body 1032 through an aperture 1043 in the first connector support 341. The first snubber 1034 is movable back and forth in the Z direction relative to the body 1032 and is operably connected to a damping mechanism (not shown) contained within the body 1032. The dampening mechanism resists motion of the first snubber 1034 in proportion to the rate of snubber motion. In one embodiment, the dampening mechanism can be a pneumatic device. In other embodiments, the dampening mechanism can be other types of devices such as a hydraulic device. In yet other embodiments, the dampening mechanism can include a spring to provide the desired amount of compression dampening.

Another aspect of this embodiment is that the second connector unit 212 includes a second snubber 1036 extending outwardly from the second connector support 641 in axial alignment with the first snubber 1034. When the first connector unit 211 is moved toward the second connector unit 212 for engagement of the respective connector sets, the second snubber 1036 contacts the first snubber 1034 before any portion of the first connector sets 351 contacts the second connector sets 652. In this way, the shock absorber system 1030 prevents damage to the connector sets 351 and 652 caused by inadvertently ramming the first connector unit 211 into the second connector unit 212. After initial snubber contact, further movement of the first connector unit 211 in the Z direction proceeds at a controlled rate dictated by the amount of dampening provided by the mechanism contained in the shock absorber body 1032.

The shock absorber system 1030 described above and illustrated in FIG. 10 is but one dampening method that can be employed to prevent or reduce the likelihood of damage during engagement of the first connector unit 211 with the second connector unit 212. Accordingly, in other embodiments, the connector assembly 110 can include other dampening features. For example, in one embodiment, dampening features can be incorporated into the extendable members 230 that support the first connector support 341. In yet another embodiment, dampening features can be omitted.

Figure 11:
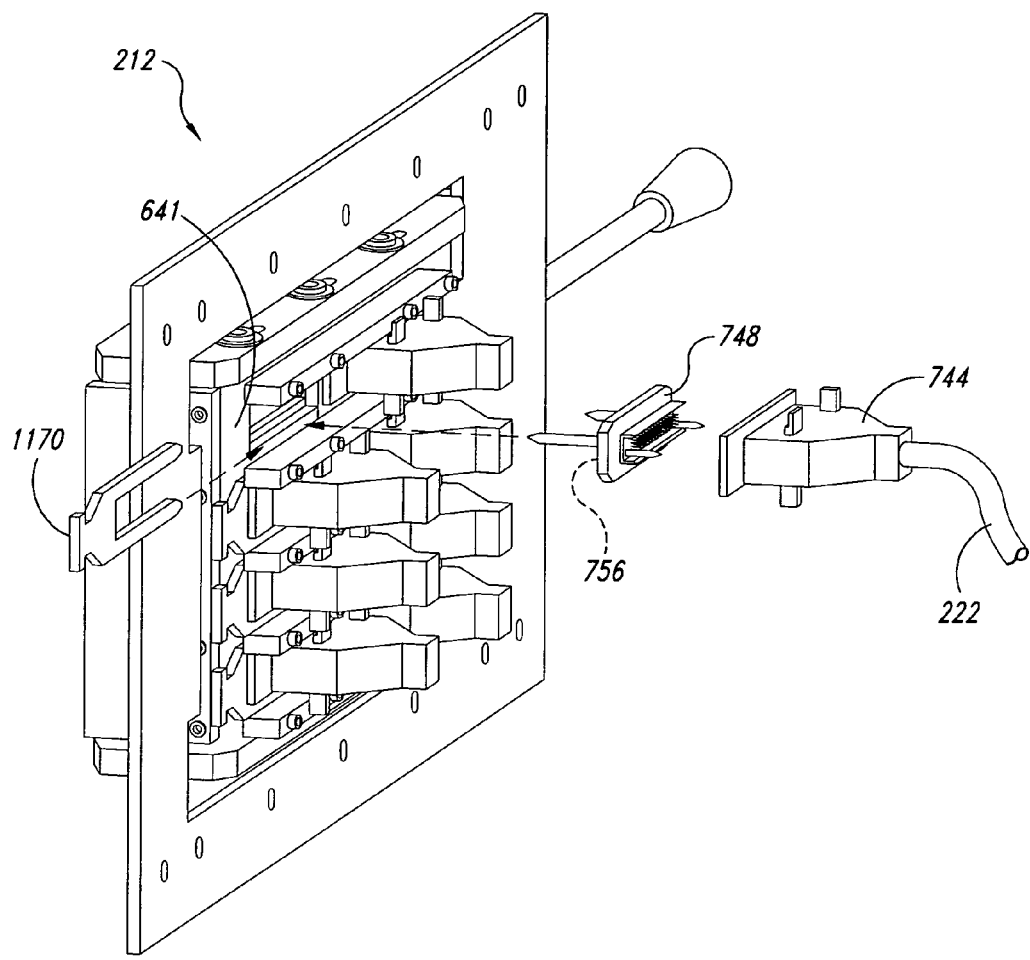
FIG. 11 is a rear isometric view of the second connector support of FIG. 7 illustrating a quick-change feature of an embodiment of the invention.

FIG. 11 is an exploded rear isometric view of the second connector unit 212 illustrating a quick-change feature of one embodiment of the invention. In one aspect of this embodiment, the second contact array 756 and the associated array frame 748 are held in position on the second connector support 641 by a removable retainer 1170. A second connector back-shell 744 operatively couples the second contact array 756 to the second processor bank 102b (FIGS. 1 and 2). In the event that the second contact array 756 is damaged during use or is otherwise inoperative, it can be replaced individually without having to access the other contact arrays on the second connector unit 212. First, the second connector back-shell 744 is disengaged from the second contact array 756. Next, the retainer 1170 is removed from the second connector support 641 allowing the second contact array 756 and the associated second array frame 748 to be moved clear of the second connector support 641. A new second contact array 756 can then be installed in the vacant aperture in the second connector support 641 and held in position with the retainer 1170. Finally, the second connector back-shell 744 can be connected to the new second contact array 756.

One feature of embodiments of the invention described above with reference to FIGS. 1–11 is that the respective connector sets are aligned in stages as the connector sets move closer together. In one embodiment, one stage of alignment is provided by beveled surfaces that align the respective connector supports. Another stage of alignment is provided by primary guide pins and corresponding primary pin bores that align the respective connector back-shells. A further stage of alignment is provided by secondary guide pins and corresponding secondary pin bores that align the respective contact array frames. The ability of the connector back-shells and the contact array frames on at least one of the connector supports to move small distances in the X-Y plane facilitates the alignments stages and greatly reduces the probability of damaging a connector pin or socket during engagement of the corresponding connector sets.

Engagement of individual connector sets with large numbers of pins can require a significant force at final engagement. This force naturally increases as the number of connector sets increases, and may be as high as 500 lbs. for a relatively large number of connector sets. Another feature of embodiments of the invention described above is that the drive assembly 670 (FIG. 6) can provide a relatively large and uniformly distributed force for engagement of respective connector sets. This force enables a relatively large number of connector sets to be engaged at least approximately concurrently. This feature saves time and can reduce or prevent damage to individual connector pins/sockets when connecting one processor bank to another processor bank.

The blocking pin 692 and the lever lock 694 (FIG. 6) are further aspects of embodiments of the invention described above. In one embodiment, these safety features must be affirmatively retracted by an operator before the first connector unit 211 can be engaged with the corresponding second connector unit 212. Accordingly, these safety features prevent inadvertent contact between the respective connector sets that could result in damage to one or more of the connector pins/sockets.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A computer system comprising:
 a first bank of processors;
 a second bank of processors spaced apart from the first bank of processors; and
 a connector assembly configured to operatively connect at least a portion of the first bank of processors to at least a portion of the second bank of processors, the connector assembly having—
   (a) a first connector unit including a plurality of individual first connector sets that include a plurality of first contacts operatively connected to the first bank of processors,
   (b) a second connector unit including a plurality of second connector sets that include a plurality of second contacts operatively connected to the second bank of processors, and
   (c) a movable guide structure carrying at least one of the first and second connector units, wherein the movable guide structure extends and retracts to accommodate movement of the at least one of the first and second connector units relative to the other one of the first and second connector units to align the plurality of first connector sets with corresponding second connector sets and releasably engage the plurality of first contacts with the plurality of second contacts.

2. The computer system of claim 1 wherein the first bank of processors include processors housed in cabinets arranged in a first bank, and wherein the second bank of processors includes processors housed in cabinets arranged in a second bank spaced apart from the first bank.

3. The computer system of claim 1 wherein:
 the first bank of processors includes processors housed in cabinets arranged in a first bank;
 the second bank of processors includes processors housed in cabinets arranged in a second bank spaced apart from the first bank;
 the plurality of first contacts are operatively connected to the first bank of processors via at least a first cable extending from the first bank of cabinets to the first connector unit; and
 the plurality of second contacts are operatively connected to the second bank of processors via at least a second cable extending from the second bank of cabinets to the second connector unit.

4. The computer system of claim 1 wherein the first connector unit further includes a connector support, and wherein the plurality of first connector sets are carried individually by the connector support.

5. The computer system of claim 1 wherein the first connector unit further includes a connector support, and wherein the plurality of first connector sets are carried individually by the connector support and the first connector sets are configured to move in at least one direction relative to the connector support.

6. The computer system of claim 1 wherein the first connector unit further includes a first alignment feature and the second connector unit further includes a corresponding second alignment feature configured to cooperate with the first alignment feature so that the plurality of first contacts are properly aligned with corresponding second contacts.

7. The computer system of claim 1 wherein the first connector unit further includes at least one guide pin bore and the second connector unit further includes a corresponding guide pin configured to be received by the guide pin bore so that the plurality of first contacts are properly aligned with corresponding second contacts.

8. The computer system of claim 1 wherein:
 the first connector unit further includes a first primary alignment feature and a first secondary alignment feature; and
 the second connector unit further includes a second primary alignment feature and a second secondary alignment feature, wherein—
 the first primary alignment feature of the first connector unit is configured to cooperate with the second primary alignment feature of the second connector unit to provide a first stage of alignment between the first contacts and the corresponding second contacts, and
 the first secondary alignment feature of the first connector unit is configured to cooperate with the second secondary alignment feature of the second connector unit to provide a second stage of alignment between the first contacts and the corresponding second contacts, the second stage of alignment being closer than the first stage of alignment.

9. The computer system of claim 1 wherein:
 the first connector unit further includes a primary guide pin bore and a secondary guide pin bore; and
 the second connector unit further includes a primary guide pin and a secondary guide pin, wherein—
 the primary guide pin bore of the first connector unit is configured to receive the primary guide pin of the second connector unit to provide a first stage of alignment between the plurality of first contacts and the corresponding second contacts, and
 the secondary guide pin bore of the first connector unit is configured to receive the secondary guide pin of the second connector unit to provide a second stage of alignment between the plurality of first contacts and the corresponding second contacts, the second stage of alignment being closer than the first stage of alignment.

10. The computer system of claim 9 wherein at least one of the first connector sets further includes a connector back-shell and a contact array frame, wherein the contact array frame carries the plurality of first contacts in the connector back-shell, and wherein the connector back-shell includes the primary guide pin bore and the contact array frame includes the secondary guide pin bore.

11. The computer system of claim 9 wherein at least one of the first connector sets further includes a connector back-shell and a contact array frame, wherein the contact array frame carries the plurality of first contacts in the connector back-shell and is free to move small distances laterally relative to the connector back-shell, and wherein the connector back-shell includes the primary guide pin bore and the contact array frame includes the secondary guide pin bore.

12. The computer system of claim 9 wherein at least one of the first connector sets further includes a connector back-shell and a contact array frame, wherein the contact array frame carries the plurality of first contacts in the connector back-shell and individual first contacts are free to move small distances relative to each other in the contact array frame, and wherein the connector back-shell includes the primary guide pin bore and the contact array frame includes the secondary guide pin bore.

13. The computer system of claim 1 wherein the connector assembly further comprises a drive assembly operably coupled to at least one of the first connector unit and the second connector unit, wherein the drive assembly is configured to drive at least one of the first and second connector units toward the other one of the first and second connector units to releasably engage the plurality of first contacts with the plurality of second contacts.

14. The computer system of claim 1 wherein the guide structure comprises an extendable member that moves along a guide path, and wherein the first connector unit is mounted to the extendable member so that the first connector sets are generally aligned with the second connectors.

15. The computer system of claim 1 wherein at least one of the first connector unit and the second connector unit includes a shock absorber configured to contact the other one of the first connector unit and the second connector unit and control the rate of engagement of the plurality of first connector sets with the plurality of second connector sets.

16. The computer system of claim 1 wherein at least one of the first connector unit and the second connector unit includes a blocking member that retractably extends into the path of the other of the first connector unit and the second connector unit to block the plurality of first connector sets from inadvertently contacting the corresponding second connector sets.

17. The computer system of claim 1 wherein at least one of the first connector unit and the second connector unit includes a retractable pin that movably extends into the path of the other of the first connector unit and the second connector unit to block the plurality of first connector sets from inadvertently contacting the corresponding second connector sets.

18. A computer system comprising:
a first bank of processors;
a second bank of processors spaced apart from the first bank of processors; and
a connector assembly configured to operatively connect at least a portion of the first bank of processors to at least a portion of the second bank of processors, the connector assembly having—
(a) a first connector unit with a plurality of first connector sets operatively connected to the first bank of processors,
(b) a second connector unit with a plurality of second connector sets operatively connected to the second bank of processors, and
(c) a drive assembly operably coupled to at least one of the first connector unit and the second connector unit, wherein the drive assembly extends and retracts to accommodate movement of the at least one of the first and second connector units relative to the other one of the first and second connector units, and wherein the drive assembly is configured to drive the at least one of the first and second connector units toward the other one of the first and second connector units to releasably engage the plurality of first connector sets with the plurality of second connector sets.

19. The computer system of claim 18 wherein the first bank of processors includes processors housed in cabinets arranged in a first bank, and wherein the second bank of processors includes processors housed in cabinets arranged in a second bank spaced apart from the first bank.

20. The computer system of claim 18 wherein:
individual first connector sets include a plurality of first contacts operatively connected to the first bank of processors;
individual second connector sets include a plurality of second contacts operatively connected to the second bank of processors; and
the drive assembly is configured to drive at least one of the first and second connector units toward the other one of the first and second connector units to releasably engage the plurality of first contacts with the plurality of second contacts.

21. The computer system of claim 18 wherein at least one of the first connector unit and the second connector unit further includes at least one cam follower, and wherein the drive assembly further includes at least one cam surface configured to cooperate with the cam follower to drive the first and second connector units together to releasably engage the plurality of first connector sets with the plurality of second connector sets.

22. The computer system of claim 21 wherein the at least one cam follower is rotatably mounted to the at least one of the first connector unit and the second connector unit.

23. The computer system of claim 18 wherein at least one of the first connector unit and the second connector unit further includes at least one cam surface, and wherein the drive assembly further includes at least one cam follower configured to cooperate with the cam surface to drive at least one of the first and second connector units toward the other one of the first and second connector units to releasably engage the plurality of first connector sets with the plurality of second connector sets.

24. The computer system of claim 18 wherein the drive assembly is manually operated to mechanically drive the at least one of the first and second connector units toward the other one of the first and second connector units to releasably engage the plurality of first connector sets with the plurality of second connector sets.

25. The computer system of claim 18 wherein the drive assembly includes a lever pivotally mounted to the second connector unit, and wherein the lever is manually rotated to mechanically drive the first connector unit toward the second connector unit to releasably engage the plurality of first connector sets with the plurality of second connector sets.

26. The computer system of claim 18 wherein the first connector unit is movable relative to the first bank of processors and the second connector unit is fixed relative to the second bank of processors, and wherein the drive assembly is operably coupled to the second connector unit and configured to drive the first connector unit toward the second connector unit to releasably engage the plurality of first connector sets with the plurality of second connector sets.

27. The computer system of claim 18 wherein the first connector unit further includes a first alignment feature and the second connector unit further includes a corresponding second alignment feature configured to cooperate with the first alignment feature so that the plurality of first contacts are properly aligned with corresponding second contacts.

28. The computer system of claim 18 wherein the first connector unit further includes at least one guide pin bore and the second connector unit further includes a corresponding guide pin configured to be received by the guide pin bore so that the plurality of first contacts are properly aligned with corresponding second contacts.

29. The computer system of claim 18 wherein:

the first connector unit further includes a first primary alignment feature and a first secondary alignment feature; and the second connector unit further includes a second primary alignment feature and a second secondary alignment feature, wherein— the first primary alignment feature of the first connector unit is configured to cooperate with the second primary alignment feature of the second connector unit to provide a first stage of alignment between the first contacts and the corresponding second contacts, and the first secondary alignment feature of the first connector unit is configured to cooperate with the second secondary alignment feature of the second connector unit to provide a second stage of alignment between the first contacts and the corresponding second contacts, the second stage of alignment being closer than the first stage of alignment.

* * * * *